Patented Jan. 11, 1949

2,459,052

UNITED STATES PATENT OFFICE 2,459,052

SIZED GLYCOL TEREPHTHALATE YARN, PROCESS, AND COMPOSITION FOR PRODUCING SAME

Richard James Smith, Manchester, England, assignor to Imperial Chemical Industries Limited, a corporation of Great Britain No Drawing. Application March 27, 1947, Serial No. 737,727. In Great Britain March 29, 1946

4 Claims. (Cl. 117—138.8)

This invention relates to the sizing of aromatic polyester yarns.

The aromatic polyesters with which the present invention is concerned are the highly polymeric linear esters obtainable by heating glycols of the series $HO(CH_2)_nOH$, where $n$ is an integer greater than 1 but not exceeding 10, with terephthalic acid or with an ester-forming derivative thereof, for example, an aliphatic (including cycloaliphatic) or aryl ester or half-ester, an acid halide or an ammonium or amine salt, under conditions which yield the esters in a highly polymerised condition. Examples of such highly polymeric linear esters are those obtainable from terephthalic acid or an ester-forming derivative thereof and ethylene glycol, trimethylene glycol, tetramethylene glycol, hexamethylene glycol and decamethylene glycol. These polyesters are high melting, difficulty soluble, colourless or substantially colourless materials which can be formed into filaments which can be extended by drawing into strong flexible fibres showing, by characteristic X-ray patterns, molecular orientation along the fibre axis. Of these polyesters, polyethylene terephthalate is preferred on account of its ready availability and of its outstanding utility as a textile material.

For many purposes, when these aromatic polyesters in the form of multi-filament yarns are to be used in the fabrication of textile materials or articles, especially by knitting, it is necessary to treat the yarn with a size which adheres to and binds the several filaments together and which is subsequently readily removed from said yarns.

It has now been found that excellent sizes for these yarns are aqueous solutions of partially hydrolysed polyvinyl acetate in admixture with a variety of other materials, namely, boric acid or barium chloride or the water-soluble resins obtainable by the condensation of an alkylourea with formaldehyde, for example, the condensation product of N-ethanolurea and formaldehyde.

According to the present invention there is provided a process for sizing multi-filament yarns composed of an aromatic polyester of the kind hereinbefore specified which comprises impregnating said yarns with an aqueous solution of partially hydrolysed polyvinyl acetate and boric acid or barium chloride or a water-soluble resin obtainable by the condensation of an alkylourea with formaldehyde.

The partially hydrolysed polyvinyl acetate to be used for the purposes of the present invention will usually have a saponification number of from 10 to 300 and preferably of from 40 to 200. The term "saponification number" is intended to mean the number of milligrams of caustic potash required to saponify completely one gram of the partially hydrolysed polyvinyl acetate.

The amount of boric acid which may be used for the purposes of the present invention will usually be from 5% to 25% by weight based on the weight of the partially hydrolysed polyvinyl acetate. Usually, the amount of boric acid will not be lower than 20% by weight of the partially hydrolysed polyvinyl acetate, but with partially hydrolysed polyvinyl acetates of high saponification numbers, lower proportions of boric acid may be desirable. The amount of boric acid should not be so great that it causes the partially hydrolysed polyvinyl acetate to precipitate or gel.

The amount of barium chloride which may be used for the purposes of the present invention will usually be from 5% to 40%, preferably from 15% to 35%, based on the weight of the partially hydrolysed polyvinyl acetate.

The preferred water-soluble resins obtainable by the condensation of an alkylourea with formaldehyde are those N-ethanol-urea and formaldehyde.

Optionally, the solution to be used for the purposes of the present invention may also contain a polyethylene oxide, preferably a polyethylene oxide having a molecular weight of between 1000 and 5000.

Optionally, also, the solution may contain other ingredients conventionally used in yarn sizing compositions.

The solution to be used for the purposes of the present invention is conveniently applied to the yarn by means of a "bobbin to bobbin" type machine in which the yarn passes over a rotating cylindrical roll dipping in the sizing composition. The speed at which the roll rotates will vary with the speed of the yarn and will depend on the amount of the solids which it is desired to apply to the yarn. The solution also can be applied by passing the yarn in a continuous fashion through a bath containing the solution or by dipping loosely wound skeins therein, followed by wringing to remove excess liquor. Any other suitable method may be employed for applying the solution. For example, the solution may be sprayed on a moving strand of yarn.

After the application of the solution the yarn may be dried in any conventional manner.

Solutions of 2% to 12% total solids content are preferred, the concentration depending on such factors as the denier and filament count of the yarn, the rate of travel of the yarn during application of the size, the temperature of the sizing solution and of the drying conditions, and the amount of solids desired on the yarn. It will be obvious, that the amount of solution applied to the yarn will vary with these or similar factors. Generally, a deposition of from 1% to 10% by weight of solids on the yarn gives the required sizing effect.

The invention is illustrated but not limited by the following examples in which parts and percentages are expressed by weight:

Example 1

An 80 denier, 12-filament, 20-turns, "S" yarn composed of the polyethylene terephthalate is sized with a solution containing 8% of a partially hydrolysed polyvinyl acetate having a saponification number of 140, 1.6% of boric acid and 90.4% of water. The size is applied by passing the yarn in warp form over a roller dipping in the solution and revolving at such rate that about 6% of solids is applied to the yarn. The sized yarn is dried in the usual manner. A well sized yarn is obtained.

Example 2

A 67 denier, 10-filament, 2-turns, "S" yarn composed of polyethylene terephthalate is sized in the manner described in Example 1 using a solution containing 8% of the partially hydrolysed polyvinyl acetate described in Example 1, 1.6% of boric acid and 1.5% of polyethylene oxide having a molecular weight of about 1500, and 88.9% of water. A well sized yarn is obtained.

Example 3

A solution is prepared by dissolving 6 parts of the partially hydrolysed polyvinyl acetate described in Example 1 and 6 parts of the water soluble condensate from N-ethanol urea and formaldehyde in 88 parts of water.

A 66 denier, 10-filament, 20-turns "Z" yarn composed of polyethylene terephthalate is passed in warp form through a conventional slasher sizing frame so that the solution is applied in such quantity that the dried yarn has 7% of solids deposited thereon. The yarn is dried, split in conventional manner and wound on to a weaver's beam.

I claim:

1. A process for sizing multifilament yarns of a linear polyester of a terephthalic acid and a glycol of the series $HO(CH_2)_nOH$ where $n$ is an integer from 2 to 10 inclusive, which comprises impregnating said yarns with an aqueous solution of a partially hydrolyzed polyvinyl acetate having a saponification number of from 10 to 300, and a water-soluble resin obtainable by the condensation of an alkylolurea with formaldehyde, said polyvinyl acetate and said water-soluble resin constituting from 2% to 12% by weight of said solution.

2. The process of claim 1 wherein the water-soluble resin is the water-soluble condensate from N-ethanol urea and aldehyde.

3. A solution for sizing yarn of a linear polyester of terephthalic acid and a glycol of the series $HO(CH_2)_nOH$ where $n$ is an integer from 2 to 10 inclusive, which consists of 6% by weight of a partially hydrolyzed polyvinyl acetate having a saponification number of 140, 6% of the water-soluble condensate from N-ethanol urea and formaldehyde, and 88% of water.

4. Multifilament yarns of a linear polyester of terephthalic acid and a glycol of the series $HO(CH_2)_nOH$ where $n$ is an integer from 2 to 10 inclusive sized with the composition of claim 3.

RICHARD JAMES SMITH.

REFERENCES CITED

The following references are of record in the file of this patent:

UNITED STATES PATENTS

| Number | Name | Date |
|---|---|---|
| 2,300,074 | Strain | Oct. 27, 1942 |
| 2,317,728 | Bristol | Apr. 27, 1943 |
| 2,324,601 | Spanagel | July 20, 1943 |
| 2,421,122 | Haefle | May 27, 1947 |

FOREIGN PATENTS

| Number | Country | Date |
|---|---|---|
| 578,079 | Great Britain | July 14, 1946 |